(12) United States Patent
Liu

(10) Patent No.: US 7,899,248 B2
(45) Date of Patent: Mar. 1, 2011

(54) FAST SEGMENTATION OF IMAGES

(75) Inventor: Che-Bin Liu, Milpitas, CA (US)

(73) Assignee: Seiko Epson Corporation, Tokyo (JP)

(\*) Notice: Subject to any disclaimer, the term of this patent is extended or adjusted under 35 U.S.C. 154(b) by 852 days.

(21) Appl. No.: 11/848,075

(22) Filed: Aug. 30, 2007

(65) Prior Publication Data

US 2009/0060330 A1    Mar. 5, 2009

(51) Int. Cl.
*G06K 9/34* (2006.01)
(52) U.S. Cl. ...................... 382/173; 382/199
(58) Field of Classification Search .......... 382/162, 382/173, 199, 232, 235, 284; 358/1.9, 2.1, 358/3.27, 464
See application file for complete search history.

(56) References Cited

U.S. PATENT DOCUMENTS

| | | | |
|---|---|---|---|
| 5,103,306 A | | 4/1992 | Weiman et al. |
| 6,731,800 B1 * | | 5/2004 | Barthel et al. ............... 382/176 |
| 6,738,496 B1 | | 5/2004 | Van Hall |
| 7,027,647 B2 * | | 4/2006 | Mukherjee et al. .......... 382/173 |
| 7,557,963 B2 * | | 7/2009 | Bhattacharjya ............ 358/3.27 |
| 2005/0180642 A1 | | 8/2005 | Curry et al. |

\* cited by examiner

*Primary Examiner*—Duy M Dang

(57) ABSTRACT

Systems, apparatuses, and methods are described for performing fast segmentation of an image. In embodiments, an image may be segmented by generating a background mask, generating an edge mask, dilating the edge mask, and refining that edge mask by applying refinement operations that remove edge pixels from the edge mask. In embodiments, the refined edge mask may be used to generate a foreground mask.

20 Claims, 15 Drawing Sheets

500-A

| -1 | 0 | +1 |
|----|---|----|
| -2 | 0 | +2 |
| -1 | 0 | +1 |

Gx

500-B

| +1 | +2 | +1 |
|----|----|----|
| 0  | 0  | 0  |
| -1 | -2 | -1 |

FAST SEGMENTATION OF IMAGES

BACKGROUND

A. Technical Field

The present invention pertains generally to digital image processing, and relates more particularly to image processing that enables fast segmentation of an image.

B. Background of the Invention

A digital image typically comprises an array of picture elements. Each picture element, also known as a "pixel," has a value and a location within the array. The value represents either the intensity of the pixel (if in grayscale) or the color of the pixel. At a higher level, pixels may be segmented into two or more groups. For example, pixels of an image may be classified into foreground and background layers or segments.

When processing a digital image, it can be beneficial to differentiate the pixels into different segments. Certain segments of the image may be of more interest than other segments, may be beneficially affected by image processing procedures, or may be adversely affected by image processing procedures. By dividing an image into different segments, one segment may be processed differently than another segment. Different methods for segmenting an image exist. Depending upon the application, it is generally preferred to have a good segmentation process that is efficient and not computationally expensive. The output of post-processing may also be affected by the method of segmentation that is used.

For example, one application of segmentation is document compression. Although compression methods help reduce file sizes, the compressed files are typically not without problems. Conventional image compression approaches that compress an entire image generally lead to unsatisfactory results in reconstructed image quality and compressed file size. When a high compression ratio is used, the compressed images may show disturbing artifacts, such as blurred text and blurred color boundaries. To obtain a high-quality compressed image, the compression ratio may need to be set very low, but the resulting file size will therefore not be substantially reduced. Thus, neither approach is particularly satisfactory. By segmenting an image into foreground and background regions, the foreground may be compressed at a different level than the background.

SUMMARY OF THE INVENTION

Systems, apparatuses, and methods are described for performing fast segmentation of an image. Depending upon the application, it is generally preferred to have a good segmentation process that is efficient and not computationally expensive.

In embodiments, an image may be segmented by generating an edge mask, dilating the edge mask, and refining that edge mask by applying refinement operations that remove edge pixels from the edge mask. Refinement operations may include removing edge pixels that do not satisfy a set of darkness criteria, removing edge pixels that also are labeled background, and removing bright-side edge pixels. In embodiments, the refined edge mask may be used to generate a foreground mask.

In embodiments, the set of darkness criteria comprises an average color value for image pixels within a first neighborhood of a dilated edge pixel being less than a first threshold value; and a difference between the first average color value and a second average color value from a second neighborhood of the dilated edge pixel, which may be smaller than the first neighborhood, being greater than a second threshold value.

In embodiments, a bright-side edge pixel has a color value that is brighter by at least a threshold value than the color value of at least one edge pixel from a neighborhood of the bright-side edge pixel. In embodiments, being brighter by at least a threshold value means that a difference between the color value of the bright-side edge pixel and a color value of at least one edge pixel in a first neighborhood of the bright-side edge pixel is greater than a first threshold; or a difference between the color value of the bright-side edge pixel and a color value of at least one edge pixel in a second neighborhood of the bright-side edge pixel is greater than a second threshold.

In embodiments, generating a background mask comprises the steps of converting the image into grayscale, generating a histogram of grayscale intensity for the image, identifying a dominant background color in a region of the histogram, calculating a background color threshold value using the dominant background color, and assigning a background label to the pixels that have a grayscale intensity value greater than the background color threshold value.

In embodiments, generating the foreground mask comprises using line scans to identify a non-edge pixel segment bounded by a first edge pixel segment and by a second edge pixel segment; and computing a first color value for the first edge pixel segment, a second color value for the second edge pixel segment, and a non-edge-pixel segment color value for the non-edge-pixel segment. If the difference between the non-edge-pixel segment color value and the average of the first and second color values is below a threshold value, and, in embodiments, if a threshold size limit is satisfied, the pixels in the combined first edge pixel segment, second edge pixel segment, and non-edge-pixel segment may be identified as solid region pixels.

In embodiments, the generated foreground mask, refined edge mask, and/or background mask may be used or undergo one or more post-processing operations. For example, in an embodiment, post processing may include compressing the image. In embodiments, the compressed image is a portable document format ("PDF") image.

In embodiments, a median filter may be applied to non-edge areas of the image.

In embodiments, a system for segmenting an image may comprise a background mask generator, an edge detector, an edge mask dilator, an edge mask refiner, and a foreground mask generator. In embodiments, an edge mask refiner may apply refinement operations that remove edge pixels from the edge mask. Refinement operations may include removing edge pixels that do not satisfy a set of darkness criteria, removing edge pixels that also are labeled background, and removing bright-side edge pixels.

In embodiments, the set of darkness criteria comprises an average color value for image pixels within a first neighborhood of a dilated edge pixel being less than a first threshold value; and a difference between the first average color value and a second average color value from a second neighborhood of the dilated edge pixel, which may be smaller than the first neighborhood, being greater than a second threshold value.

In embodiments, a bright-side edge pixel has a color value that is brighter by at least a threshold value than the color value of at least one edge pixel from a neighborhood of the bright-side edge pixel. In embodiments, being brighter by at least a threshold value means that a difference between the color value of the bright-side edge pixel and a color value of at least one edge pixel in a first neighborhood of the bright-side edge pixel is greater than a first threshold; or a difference between the color value of the bright-side edge pixel and a color value of at least one edge pixel in a second neighborhood of the bright-side edge pixel is greater than a second threshold.

In embodiments, the foreground mask generator may generate a foreground mask using line scans.

In embodiments, the system may also comprise a color matcher, a refiner, and/or post processor. Image enhancement, image compression, watermarking, special effects, and video editing are examples of post-processing operations that may be alternatively performed or alternatively included within embodiments of a system.

In embodiments, an apparatus for refining an edge mask may comprise a dark edge pixel retainer that may remove edge pixels that do not satisfy a set of darkness criteria, a background excluder that may remove edge pixels that also are labeled background, and a bright-side edge pixel remover that may remove bright-side edge pixels.

In embodiments, the set of darkness criteria comprises an average color value for image pixels within a first neighborhood of a dilated edge pixel being less than a first threshold value; and a difference between the first average color value and a second average color value from a second neighborhood of the dilated edge pixel, which may be smaller than the first neighborhood, being greater than a second threshold value.

In embodiments, a bright-side edge pixel has a color value that is brighter by at least a threshold value than the color value of at least one edge pixel from a neighborhood of the bright-side edge pixel. In embodiments, being brighter by at least a threshold value means that a difference between the color value of the bright-side edge pixel and a color value of at least one edge pixel in a first neighborhood of the bright-side edge pixel is greater than a first threshold; or a difference between the color value of the bright-side edge pixel and a color value of at least one edge pixel in a second neighborhood of the bright-side edge pixel is greater than a second threshold.

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

Figure ("FIG.") 1 depicts a block diagram of a system for fast conversion of an image into image segments, which may undergo additional post-processing, according to embodiments of the invention.

FIG. 5 depicts, for purposes of illustration, convolution masks used in Sobel edge detection according to embodiments of the invention.

DETAILED DESCRIPTION OF THE PREFERRED EMBODIMENTS

Figure 1:
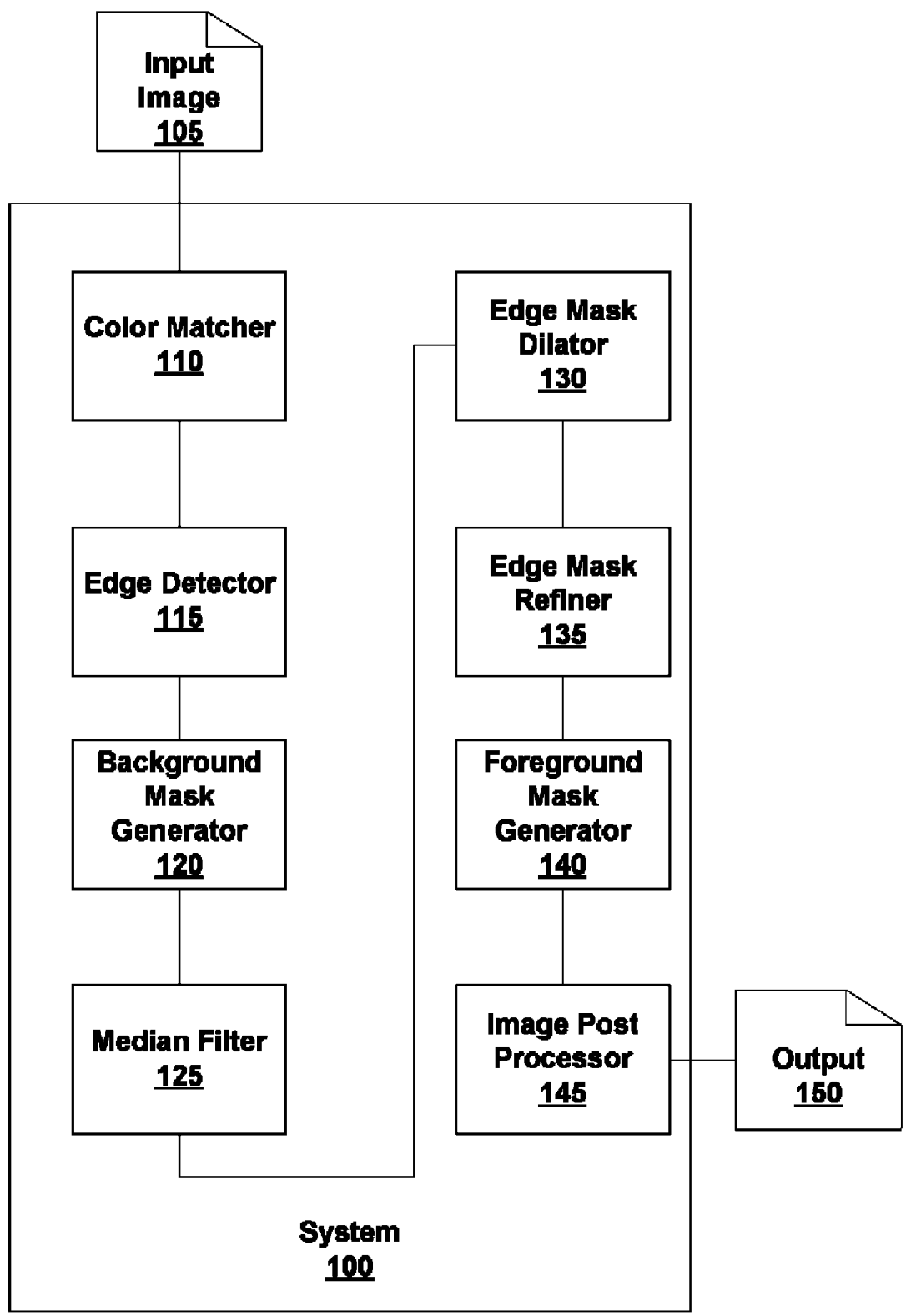

Systems, apparatuses, and methods are described for performing fast segmentation of an image. In embodiments, an image may be segmented by generating a background mask, generating an edge mask, dilating the edge mask, and refining that edge mask by applying refinement operations that remove edge pixels from the edge mask. Refinement operations may include removing edge pixels that do not satisfy a set of darkness criteria, removing edge pixels that also are labeled background, and removing bright-side edge pixels. In embodiments, the refined edge mask may be used to generate a foreground mask.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different systems and devices including camera, scanners, printers, computers, facsimile machine, mobile devices, including those devices with a display or camera capabilities, multimedia devices, multifunction devices, and the like. The embodiments of the present invention may be implemented in software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that the various components, or portions thereof, may be divided into separate components or may be integrated together, including integrating within a single system or component.

Furthermore, connections between components/modules within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment" or "an embodiment" means that a particular feature, structure, characteristic, or function described in connection with the embodiment is included in at least one embodiment of the invention and may be in more than one embodiment. The appearances of the phrase "in one embodiment" or "in an embodiment" in various places in the specification are not necessarily all referring to the same embodiment.

It should be noted that the examples illustrated herein deal with images with light background and darker foreground. The examples are provided by way of explanation and not limitation. One skilled in the art shall recognize that the systems and methods discussed herein may be applied to or adapted for images with dark background and lighter foreground. For example, in an embodiment, the present system and methods may negate the color of the image and process the image using the same or similar methods as disclosed herein. In an embodiment, the present systems and methods may determine, for an image or a section of an image, whether it is a light background/darker foreground or dark background/lighter foreground image.

A. System Implementations

FIG. 1 depicts a system 100 for fast segmentation of an image 105 according to embodiments of the invention. System 100 comprises a color matcher 110, an edge detector 115, a background mask generator 120, a median filter 125, an edge mask dilator 130, an edge mask refiner 135, a foreground mask generator 140, and an image post processor 145.

In embodiments, color matcher 110 receives an input image 105 and adjusts its color to be closer to the color of its corresponding original image. In embodiments, color matching involves enhancing the image colors and suppressing the background. For example, the input image may be a "scanned image" produced from its corresponding original image by a scanner device. A scanned image usually is darker than its corresponding original image, so the colors in the scanned image may be corrected to more closely represent the colors in the original image. The background of the scanned image may have a color other than white and that background color may be suppressed in order to improve contrast. For example, the paper on which a page is printed may have a color other than true white, which may be the desired background color of the scanned image.

In embodiments, one or more types of color adjustment may be used in performing color matching. One type of adjustment may be a "white point" adjustment, which may be used to adjust a color range supported by a device, such as a scanner. In one example, an original image may cover a grayscale range from 0 to 255, but a scanner may only support a grayscale range from 15 to 200. In an embodiment, a white point adjustment may map the darkest color produced by a scanner to black (0), and the lightest color produced by a scanner to white (255). Using the white point adjustment, a scanned image may be corrected to be a more accurate representation of the range of colors in the original image.

Another type of color adjustment may be a color matching table/transform that maps a spectrum of colors produced by a device, such as a scanner, to a spectrum of true colors that may be present in an original image. In embodiments, device dependent color calibration tables/transforms may be provided by device manufacturers. In alternative embodiments, one or more default color calibration tables/transforms may be used. In other alternative embodiments, no color matching table may be available, but methods known to those skilled in the art may be used to dynamically construct a color matching table such as, for example, using a white point adjustment. It should be noted that color matching may be beneficial when the image information is being communicated between devices, such as, for example from one copier to another copier or to a computer screen. Accordingly, the color matcher may provide adjustments given the intended output display. In embodiments, the labeled image may be used to perform differential enhancement for viewing or printing of the compressed image. For example, printing often requires higher levels of sharpening for high-quality text than what would be required for viewing on a computer screen. The label information may also be used to switch between printer/screen color tables to improve the rendering of the image or portions thereof, such as non-halftone edges that typically correspond to text on background regions. For example, lower frequency screens may be used over pixels labeled halftone edge or halftone to improve tone stability in devices such as color laser printers and may also provide a greater number of tones.

In embodiments, an edge detector 115 receives a color adjusted image and produces an edge mask in which the edge pixels are identified or labeled. In embodiments, a pixel may be labeled an "edge pixel" if it is located in a boundary region between two regions of an image such as, for example, foreground and background regions. The foreground region of an image typically contains the most important information in an image. For example, the text and graphics of an image of a document page are typically considered to be in the foreground region of the image, while the paper and associated watermarks are typically considered to be in the background region of the image. Identification of the boundary between the foreground and background regions of an image facilitates identification of the regions.

Those skilled in the art will recognize that numerous edge detection methods may be used to identify edge pixels within an image and to generate an edge mask. One example edge detection method is Sobel edge detection. In embodiments, edge detector 115 may use two convolution masks to detect both horizontal and vertical edges. In embodiments, Sobel edge detection may be applied to a grayscale version of the image to compute an approximate gradient magnitude for each pixel. Pixels with a gradient magnitude larger than a predefined grayscale threshold may be classified as edge pixels.

In alternative embodiments in which there may be some foreground regions with similar intensity to the background (for example, an image of a page containing yellow text on a bright background), edge detection may additionally include an application of edge detector 115 in a color channel, such as, using the color values in the blue (B) channel of pixel red-green-blue (RGB) color values. For the example of yellow text on a bright background, the intensity gradient magnitude in the B channel calculated for a pixel may be compared to a predefined yellow-scale threshold value instead of to a predefined grayscale threshold value in order to identify edge pixels.

In embodiments, background mask generator 120 receives a color adjusted image and performs an analysis of the image pixels in order to identify (label) the pixels in the background region. In embodiments, the image pixel colors are converted to grayscale, and a histogram of the pixels' grayscale values is plotted. In embodiments, an analysis of the histogram determines a "dominant background color." In embodiments, the dominant background color may be set as the brightest color shared by the largest group of pixels; alternatively, the dominant background color may be the average color (mean, median, or mode) of pixels in a region of the histogram. In embodiments, the dominant background color is used to compute a background color threshold value. All pixels with a color value greater than (brighter than) the background color threshold may be identified (labeled) as background pixels. A background mask may be generated from the set of labeled background pixels in the image.

In embodiments, median filter 125 receives a color adjusted image with labeled edge pixels. Median filtering may be used to remove artifacts, such as Moire patterns, from non-edge areas of the image.

In embodiments, edge mask dilator 130 receives an edge mask and applies a dilation operation to the edge pixels in the edge mask in order to generate a dilated edge mask. In embodiments, a one pixel dilation may be applied to each edge pixel in the edge mask. In embodiments, a 3×3 square dilation object may be applied to the edge pixels. Those skilled in the art will recognize that various types and sizes of dilation objects may be used in a dilation operation. The dilated edge mask will have enhanced, or thicker, edges than the received edge mask. An edge pixel that was not assigned an edge label by an edge detector but was assigned an edge label as a result of edge pixel dilation may be referred to as a "dilated edge pixel."

In embodiments, edge mask refiner 135 receives a dilated edge mask and applies at least one refinement operation to the edge pixels in the dilated edge mask to more precisely define the edges in the image. A refinement operation applies additional classification criteria to an edge pixel that may result in removing an edge pixel from the edge mask. In embodiments, the refinement operation may result in re-labeling the edge pixel as a background pixel. A refined thin edge mask is generated from the dilated edge mask after application of at least one refinement operation.

In embodiments, foreground mask generator 140 receives a refined thin edge mask, which may be used to generate a foreground mask. In embodiments, horizontal and/or vertical line scans may be used to identify a non-edge-pixel segment bounded by a first edge pixel segment and a second edge pixel segment. A first color value may be computed for the first edge pixel segment. A second color value may be computed for the second edge pixel segment, and a non-edge-pixel segment color value may be computed for the non-edge-pixel segment. In embodiments, a segment may be one or more pixels, and the color values may be the mean, median, or mode of a segment. In embodiments, responsive to the difference between the non-edge-pixel segment color value and the average of the first and second color values being below a threshold value, the combined first edge pixel segment, second edge pixel segment, and non-edge-pixel segment may be identified as solid color region pixels and included in the image foreground mask. One skilled in the art will recognize that the larger the threshold value, the more variance in color the segments may have and still be classified as a solid color region.

In embodiments, the selection of a solid color region may include a size constraint. One or more of the lengths of the combined length of the first edge pixel segment, second edge pixel segment, and non-edge-pixel segment; the combined length of the first edge pixel segment and non-edge-pixel segment; the combined length of the second edge pixel segment and non-edge-pixel segment; and the length of the non-edge-pixel segment, may be required to be below a threshold length or lengths. If the size constraint is met, the combined first edge pixel segment, second edge pixel segment, and non-edge-pixel segment may be identified as solid color region pixels and included in the image foreground mask. In embodiments, additional or alternative constraints may be imposed upon a line scan in order for it to be classified as solid color pixels. An additional or alternative constraint may be that at least a portion of the preceding line scan be identified as edge pixels or solid color pixels.

In embodiments, image post processor 145 receives the segmentation information and the color adjusted image. One skilled in the art shall recognize that, having obtained image layers or segments, any of a number of post-processing operations may be performed in order to generate output 150. Image enhancement, image compression, watermarking, special effects, and video editing are examples of post-processing operations that may be alternatively performed or alternatively included within a system, such as system 100.

One example of a post-processing operation is document compression. Because the background layer typically does not contain important information, as part of post processing, the background layer may undergo more aggressive compression than the foreground layer. In embodiments, a high-quality, compact PDF document may be generated from an image created by a scanner device.

Figure 2:
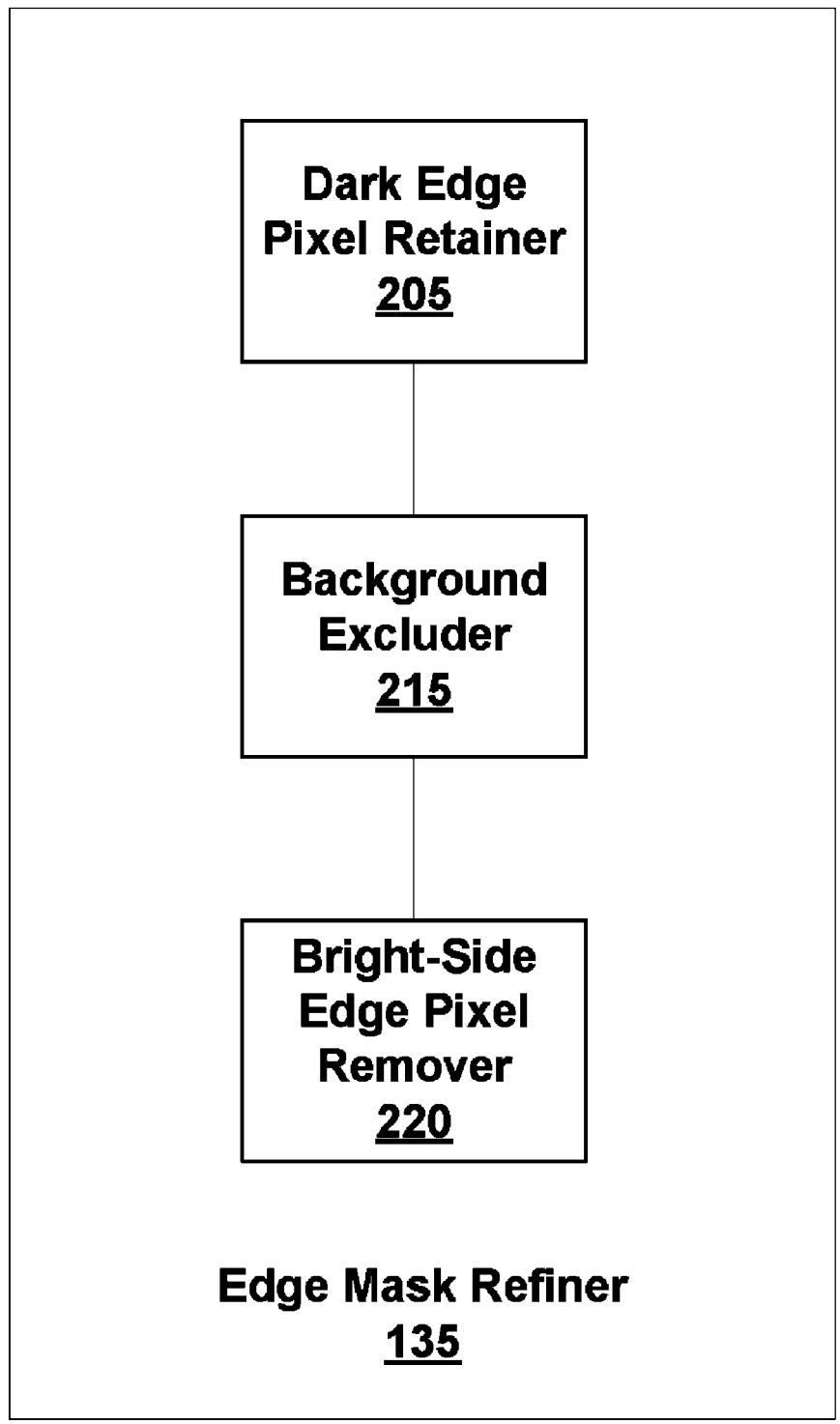
FIG. 2 depicts a block diagram of an edge mask refiner apparatus according to embodiments of the invention.

Turning now to FIG. 2, depicted in the figure is an edge mask refiner apparatus 135 that receives an edge mask and applies at least one refinement operation to the edge pixels in the edge mask in order to more precisely define the edges in the image according to embodiments of the invention. The edge mask refiner 135 comprises a dark edge pixel retainer 205, a background excluder 215, and a bright-side edge pixel remover 220.

In embodiments, dark edge pixel retainer 205 receives an edge mask and re-labels as background any edge pixel that was not labeled as a result of edge detection or does not satisfy at least one of a set of darkness criteria. In embodiments, darkness criteria may be examined by computing the average color of image pixels within a defined neighborhood of the edge pixel and then comparing that average to a threshold value. In embodiments described herein, "average" may refer to the mean, median, or mode.

In embodiments, background excluder 215 receives an edge mask and applies a "conflict test" to the edge pixels. Any edge pixel that has been labeled a background pixel in the image background mask has its edge label removed and therefore it is removed from the edge mask.

In various embodiments, bright-side edge pixel remover 220 receives an edge mask and removes from the edge mask any edge pixel that does not satisfy at least one of a set of edge darkness criteria. In embodiments, the edge pixel may be re-labeled as background. In embodiments, edge darkness criteria are examined by computing the differences between the color of the edge pixel and the colors of edge pixels within a neighborhood of the edge pixel and then comparing the differences to a threshold value.

Figure 3:
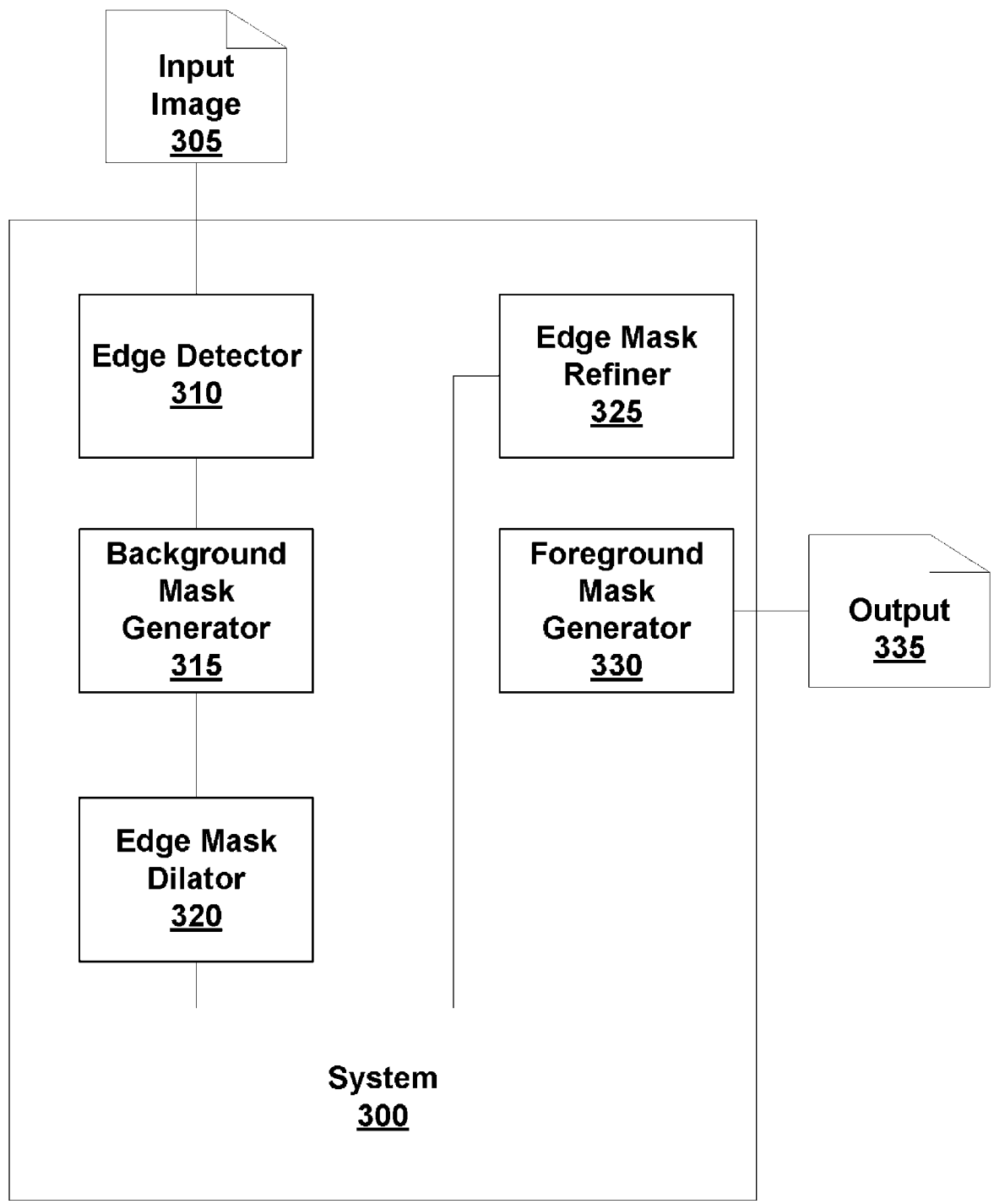
FIG. 3 depicts a block diagram of a system for fast conversion of an image into image segments according to embodiments of the invention.

FIG. 3 depicts a system 300 for fast segmentation of an image 305 according to embodiments of the invention. System 300 comprises an edge detector 310, a background mask generator 315, an edge mask dilator 320, an edge mask refiner 325, and a foreground mask generator 330. In system 300, some of the optional components of system 100 have been removed.

A color matcher 110 is not comprised within embodiments of system 300 because color correction may be applied to an input image 305 while it is being generated. For example, a scanned image may have color correction applied by the scanner as part of the scanning operation.

Furthermore, filtering may be considered an optional process. Accordingly, a median filter 125 may not be within various embodiments of system 300.

B. Methods for Fast Image Segmentation

Figure 4:
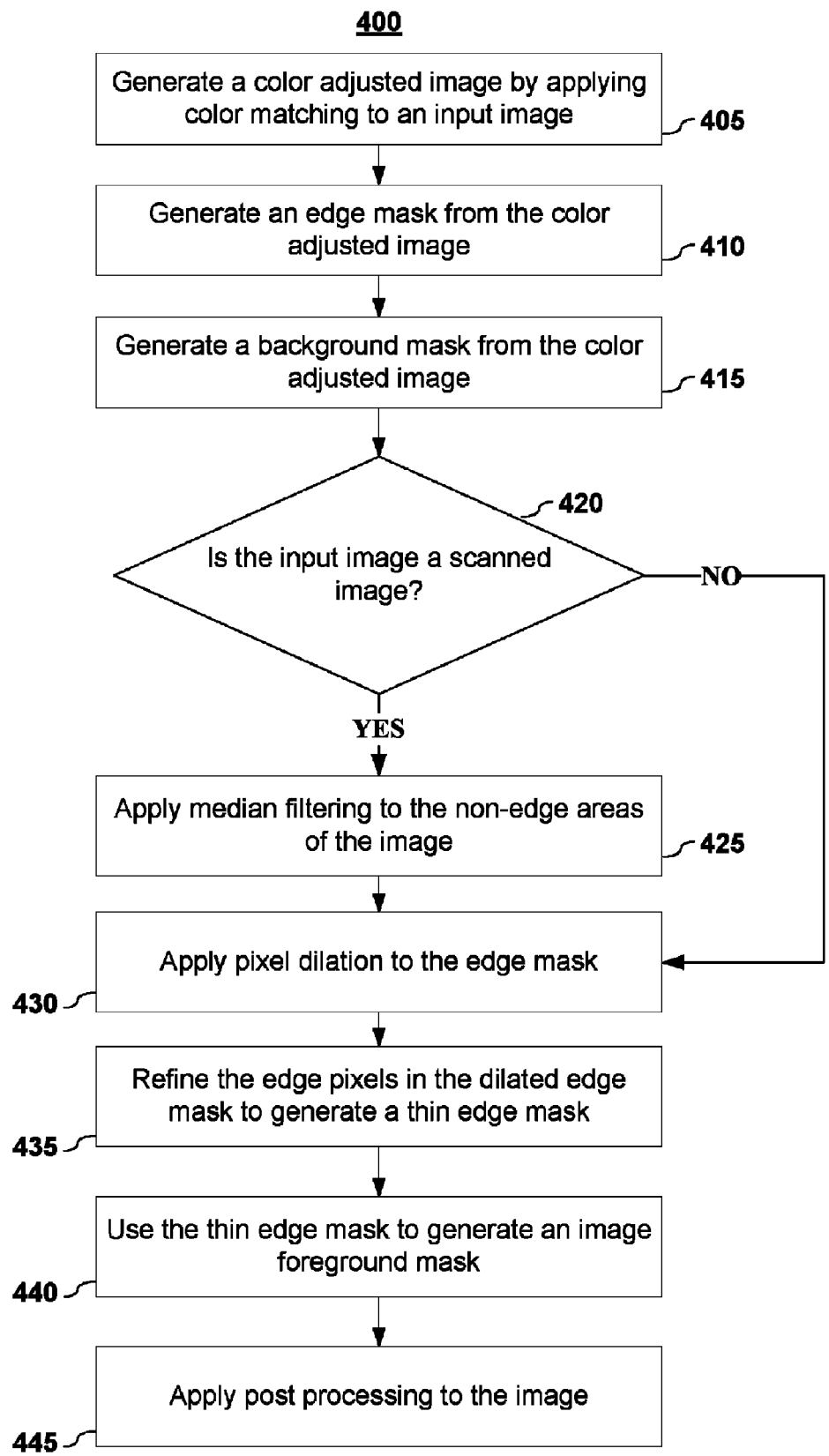
FIG. 4 depicts a method for segmenting an image according to embodiments of the invention.

FIG. 4 depicts a method 400 for fast segmentation of an image according to embodiments of the invention. Method 400 may be implemented in embodiments of system 100.

1. Color Matching

In step 405, the color of an input image is adjusted to be closer to its corresponding original image by applying color matching to the input image. Step 405 may be implemented by embodiments of color matcher 110. In embodiments, color matching involves enhancing the image colors and suppressing the background. For example, the input image may be a "scanned image" produced from its corresponding original image by a scanner device. A scanned image usually is darker than its corresponding original image, so the colors in the scanned image may be corrected to more closely represent the colors in the original image. The background of the scanned image may have a color other than white and that background color may be suppressed in order to improve contrast. For example, the paper on which a text page is printed may have a color other than true white, which may be the desired background color of the scanned image.

In embodiments, one or more types of color adjustment may be used in performing color matching. One type of adjustment may be a "white point" adjustment, which may be used to adjust a color range supported by a device, such as a scanner. In one example, an original image may cover a grayscale range from 0 to 255, but a scanner may only support a grayscale range from 15 to 200. In an embodiment, a white point adjustment may map the darkest color produced by a scanner to black (0), and the lightest color produced by a scanner to white (255). Using the white point adjustment, a scanned image may be corrected to be a more accurate representation of the range of colors in the original image. Another type of color adjustment may be a color matching table/transform that maps a spectrum of colors produced by a device, such as a scanner, to a spectrum of true colors that may be present in an original image. In embodiments, device dependent color calibration tables/transforms may be provided by device manufacturers. In alternative embodiments, one or more default color calibration tables/transforms may be used. In other alternative embodiments, no color matching table may be available, but methods known to those skilled in the art may be used to dynamically construct a color matching table such as, for example, using a white point adjustment. It should be noted that color matching may be beneficial when the image information is being communicated between devices, such as, for example from one copier to another copier or to a computer screen. Accordingly, the color matcher may provide adjustments given the intended output display. In embodiments, the labeled image may be used to perform differential enhancement for viewing or printing of the compressed image. For example, printing often requires higher levels of sharpening for high-quality text than what would be required for viewing on a computer screen. The label information may also be used to switch between printer/screen color tables to improve the rendering of the image or portions thereof, such as non-halftone edges that typically correspond to text on background regions. For example, lower frequency screens may be used over pixels labeled halftone edge or halftone to improve tone stability in devices such as color laser printers and may also provide a greater number of tones.

2. Edge Pixel Detection

Step 410 employs edge detection to label (identify) edge pixels in the color adjusted image and generate an edge mask. Step 410 may be implemented by embodiments of edge detector 115, 310.

Figure 5:
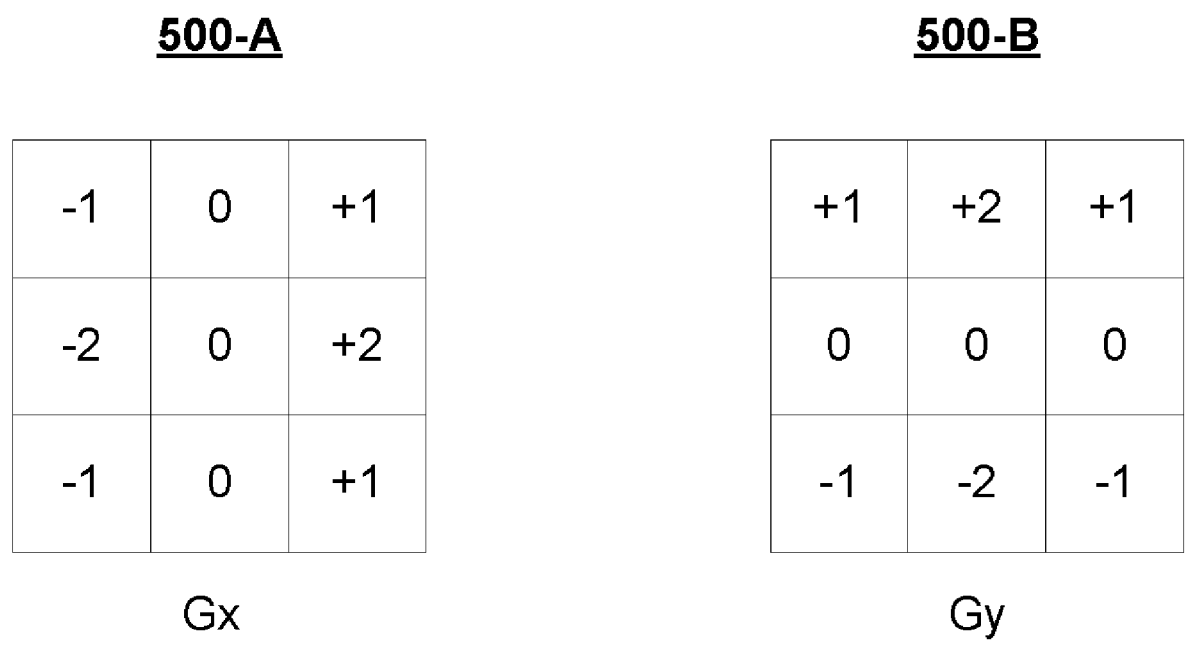

Those skilled in the art will recognize that numerous edge detection methods may be used to identify edge pixels within an image and to generate an edge mask. One example edge detection method is Sobel edge detection. In embodiments, edge detection may involve using two convolution masks to detect both horizontal and vertical edges. In embodiments, Sobel edge detection may be applied to a grayscale version of the image to compute an approximate gradient magnitude for each pixel. FIG. 5 illustrates two 3×3 masks that are convolved with the grayscale intensity image to compute the gradient values in both horizontal ($G_x$) 500-A and vertical ($G_y$) 500-B directions for each pixel. A pixel's absolute gradient magnitude may be computed as $|G|=|G_x|+|G_y|$. Pixels with a gradient magnitude larger than a predefined grayscale threshold may be classified as edge pixels.

In alternative embodiments, edge detection may additionally include an application of edge detector 115 in a color channel, such as, using the color values in the blue (B) channel of pixel red-green-blue (RGB) color values. For the example of yellow text on a bright background, the intensity gradient magnitude $|G|=|G_x|+|G_y|$ calculated for each pixel in the B channel may be compared to a predefined yellow scale threshold value instead of to a predefined grayscale threshold value in order to identify edge pixels.

3. Background Pixel and Color Estimate

Figure 6:
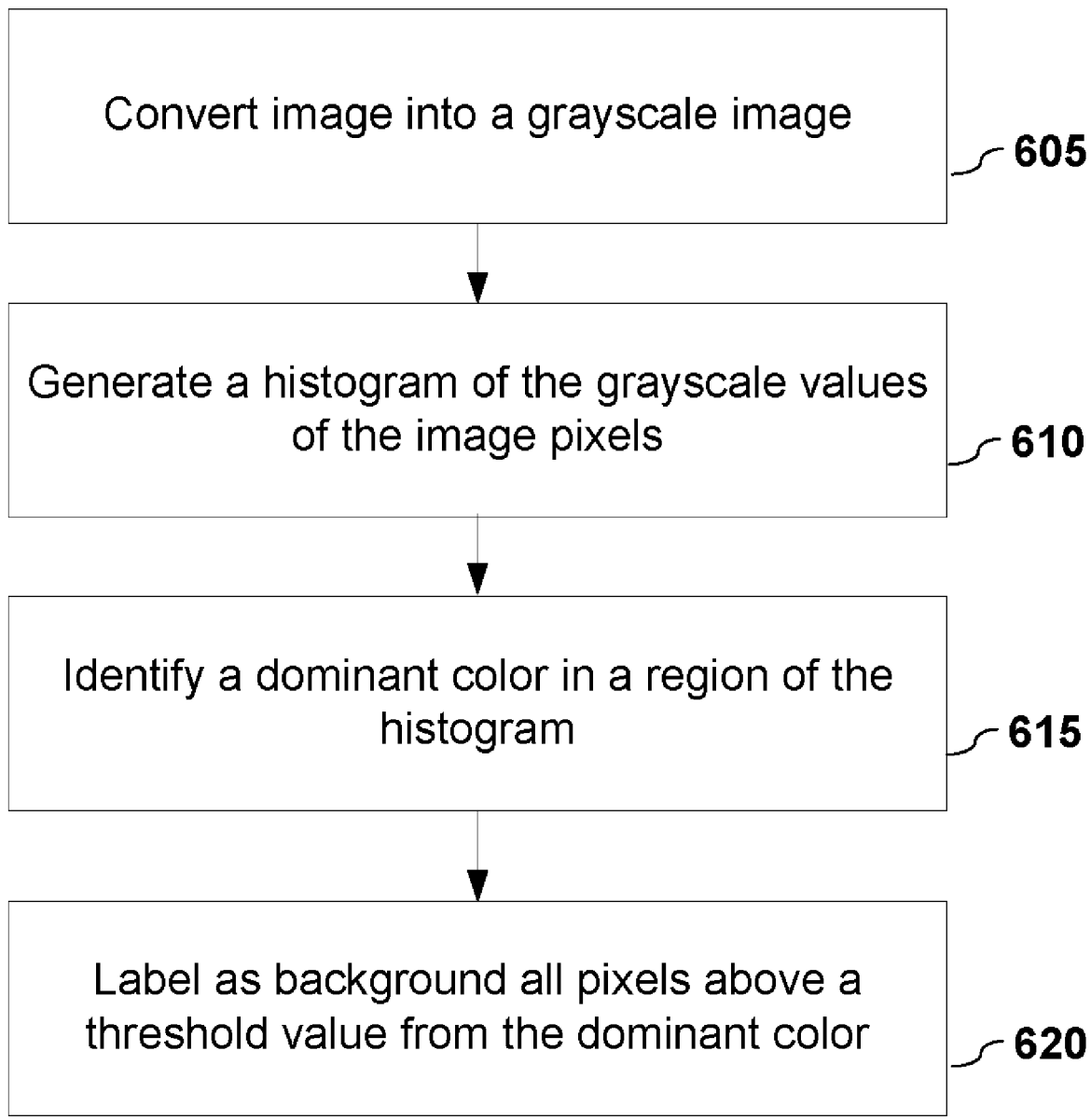
FIG. 6 depicts a method to generate a background mask based on identification of a dominant background color according to embodiments of the invention.
Figure 7:
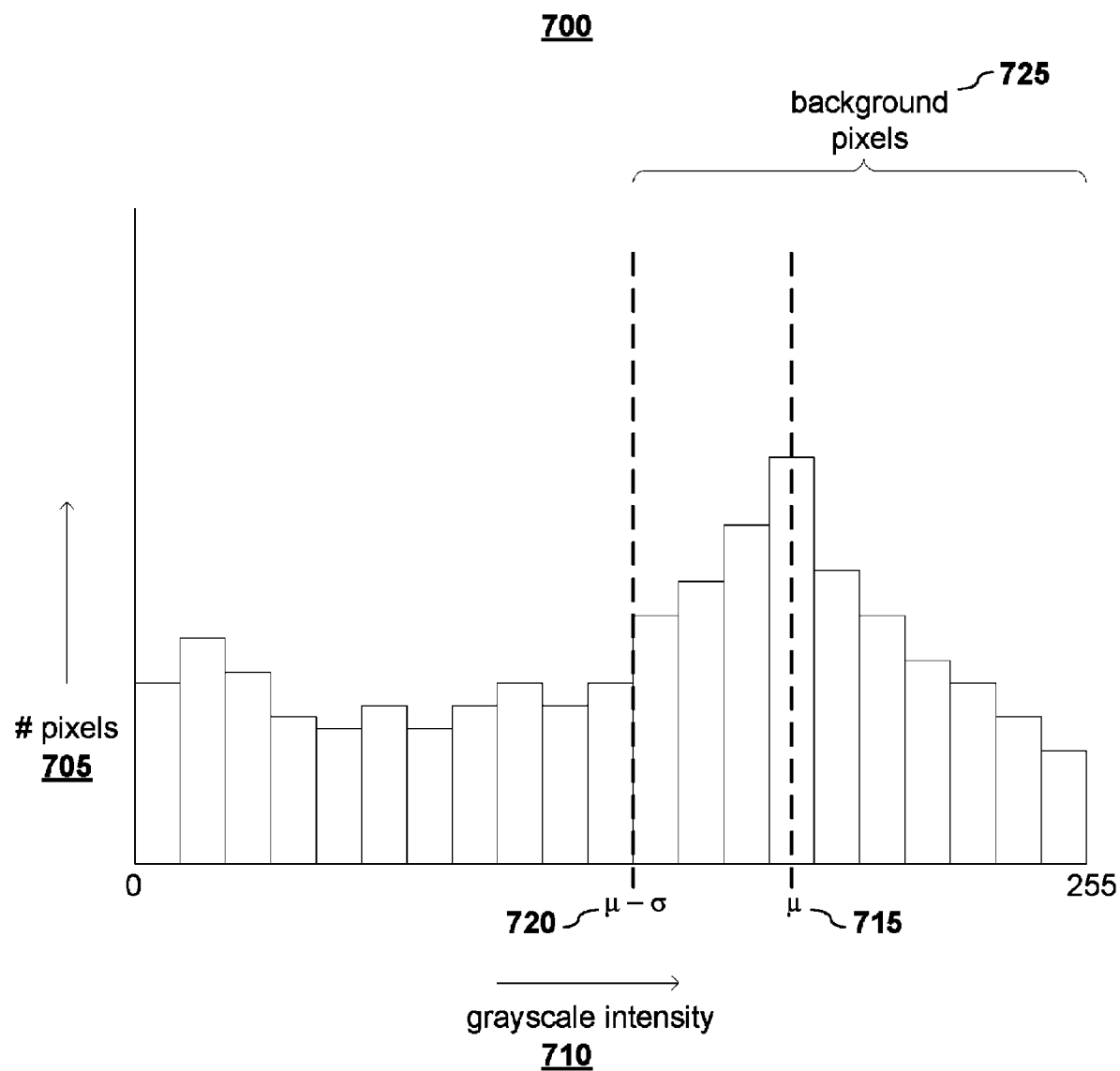
FIG. 7 illustrates a histogram analysis of the pixels in an image to determine a dominant background color according to embodiments of the invention.

In step 415, an analysis of the image pixels may be performed to identify (label) the pixels in the background region. FIG. 6 depicts a method 600 to perform this analysis according to various embodiments. Method 600 may be implemented by embodiments of background mask generator 120, 315. In embodiments, the image pixel color values are converted to grayscale values (step 605), and a histogram of the pixels' grayscale values is generated (step 610). FIG. 7 illustrates an example of a histogram 700 of the grayscale intensity values 710 of the pixels 705 in an image according to various embodiments. In embodiments, an analysis of the histogram determines (step 615) a background intensity μ (715) as a "dominant background color." In this case, the dominant background color is the brightest color shared by the largest group of pixels. In an embodiment, the dominant background color may be the average (mean, median, or mode) of pixel values in a region of the histogram. In embodiments, the dominant background color may be used to compute a "background color threshold" value, for example, μ−σ (720) where σ is a predefined threshold. In various embodiments, σ may function like or be related to the variance of background intensity. A pixel may be labeled (step 620) as a background pixel 725 if its intensity is greater than the background color threshold value. A background mask may be generated from the set of labeled background pixels in the image.

4. Median Filtering

In embodiments, median filtering (step 425) may be applied to non-edge areas of the image to mitigate artifacts, such as Moire patterns that may have been introduced as the image was generated by a scanner device. Median filtering may be implemented by embodiments of median filter 125. In step 420, a decision is made to determine if the input image was generated by a scanner device. Filtering may be considered an optional process.

5. Edge Pixel Dilation

In step 430, a dilation operation is applied to the edge pixels in the edge mask in order to generate a dilated edge mask. Step 430 may be implemented by embodiments of edge mask dilator 130, 320. In embodiments, a one-pixel dilation may be applied to the edge pixels in the edge mask. In embodiments, this entails applying a 3×3 square dilation object to the edge pixels. Those skilled in the art will recognize that various types and sizes of dilation objects may be used in a dilation operation. The dilated edge mask will have enhanced, or thicker, edges than the received edge mask. An edge pixel that was not assigned an edge label by an edge detector but was assigned an edge label as a result of edge pixel dilation may be referred to as a "dilated edge pixel."

6. Methods for Edge Mask Refinement

In step 435, at least one refinement operation is applied to the edge pixels in the dilated edge mask in order to refine the edges. A refinement operation applies additional classification criteria to an edge pixel that may result in removing that pixel as an edge pixel. In embodiments, the edge pixel may be re-labeled as background.

A refined thin edge mask is generated from the dilated edge mask after application of at least one refinement operation. In alternative embodiments, step 435 may be applied to or adapted for an edge mask in which dilation has not been applied to the edge pixels. Step 435 may be implemented by embodiments of edge mask refiner 135, 325. In alternative embodiments, edge mask refinement may be applied to an edge mask that was generated using any method known to those skilled in the art provided information about the background regions also is known or may be obtained.

Figure 8:
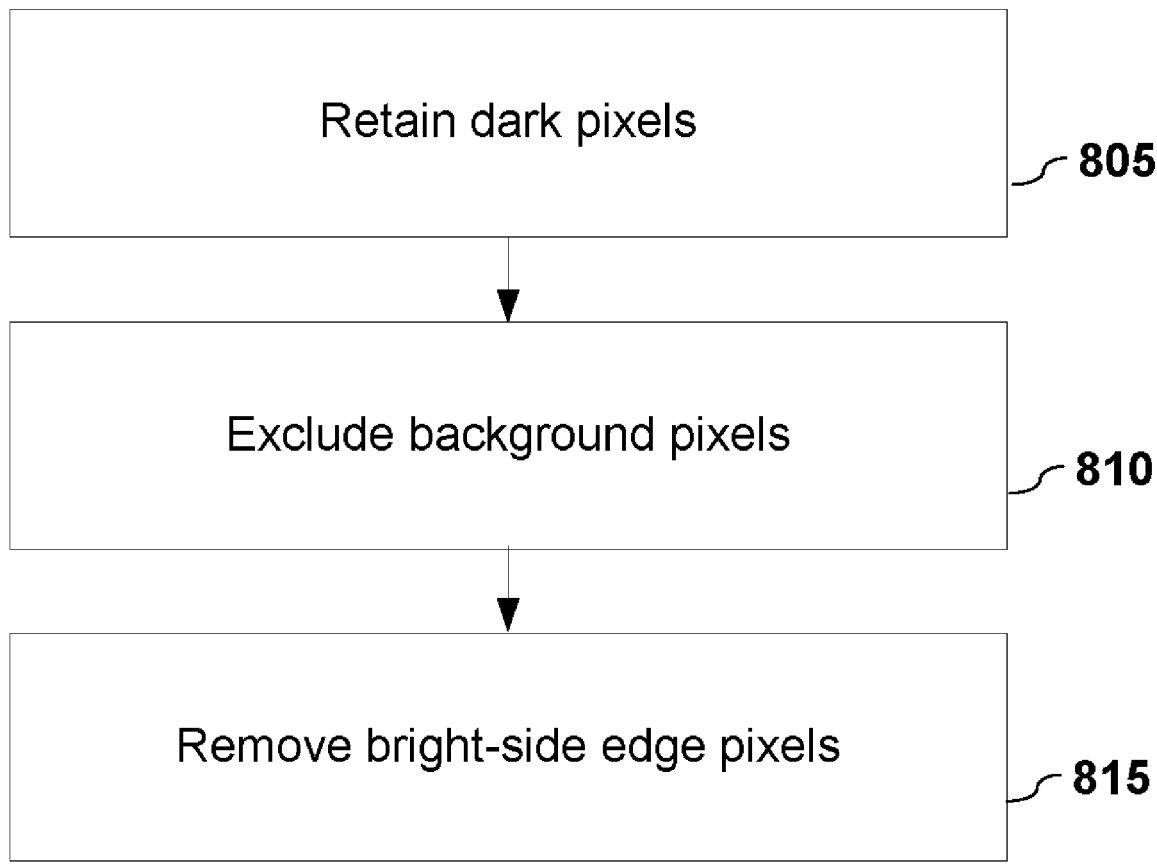
FIG. 8 depicts a method to refine an edge mask according to embodiments of the invention.

FIG. 8 depicts a method 800 for edge mask refinement according to various embodiments. Method 800 comprises the steps of retaining dark edge pixels (805), excluding background pixels (810), and removing bright-side edge pixels (815). In alternative embodiments, the order of the steps may affect the refinement. The ordering of steps depicted in FIG. 8 may bias the edge mask refinement towards the foreground region. This bias may be desirable for text preservation in a document compressing application, for example. In alternative embodiments in which step 805 is executed last, the edge mask refinement may be biased towards the background regions. This bias may be desirable for processing of a photo image containing scenes of people or landscapes, for example. In alternative embodiments, all steps may not be performed. Method 800 may be implemented by embodiments of edge mask refiner 135, 325.

a) Methods for Retaining Dark Edge Pixels

Figure 9:
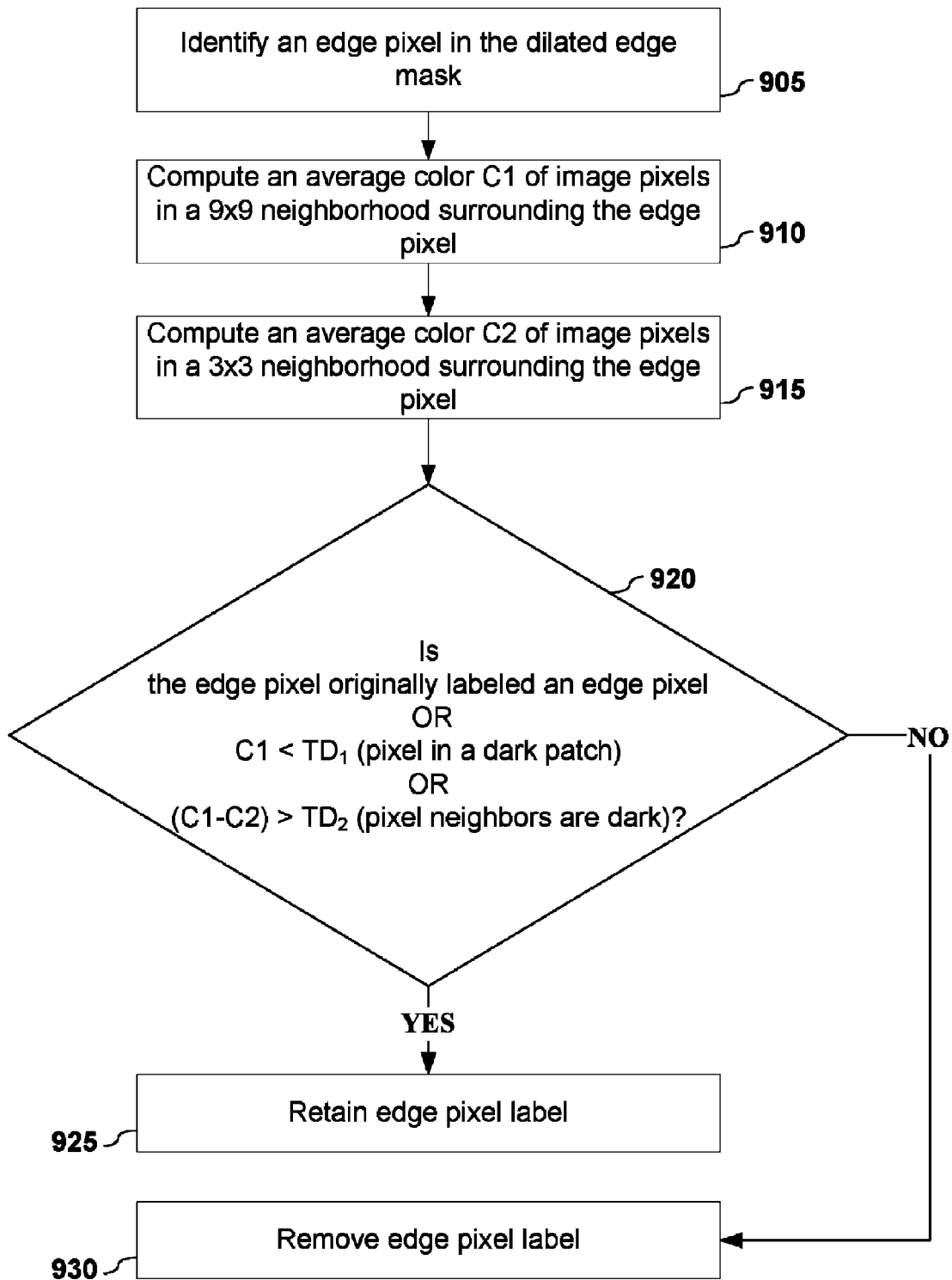
FIG. 9 depicts a method to retain dark edge pixels while refining an edge mask according to embodiments of the invention.

FIG. 9 depicts a method 900 for retaining edge pixels in an edge mask that satisfy at least one of a set of darkness criteria according to embodiments of the invention. Method 900 may be implemented as step 805 of embodiments of method 800, and by embodiments of dark edge pixel retainer 205. A darkness criterion is examined by determining the average color value of image pixels within a defined neighborhood around an edge pixel, and comparing that average color value to a predefined threshold value.

In step 905, an edge pixel in an edge mask is identified. In step 910, an average color value C1 of image pixels within a first neighborhood, such as a 9-by-9 (9×9) neighborhood, of the edge pixel is calculated. In step 915, an average color value C2 of image pixels in a second neighborhood, such as a 3×3 neighborhood, of the edge pixel is calculated. Darker colors have smaller values. A first image region darkness threshold $TD_1$ and a second image region darkness threshold $TD_2$ are defined. For example, in an embodiment $TD_1$ may be defined to be 32 and $TD_2$ may be defined to be 4.

In a decision analysis (step 920), the edge pixel's label is retained (step 925) if at least one of the following criteria are met:

1. The edge pixel's edge label was assigned by an edge detector;
2. The edge pixel is part of a dark region ($C1<TD_1$); or
3. The edge pixel's neighboring image pixels are dark (($C1-C2)>TD_2$).

In alternative embodiments, for example, cases in which the edge mask is not a dilated edge mask, the first criterion may not be applied. If none of the criteria are met, the edge pixel may be removed from the edge mask (step 930). One skilled in the art shall recognize that each criterion may be determined or evaluated separately and that if one criterion has been met that the remaining criteria need not be examined.

b) Methods for Excluding Background Pixels

Figure 10:
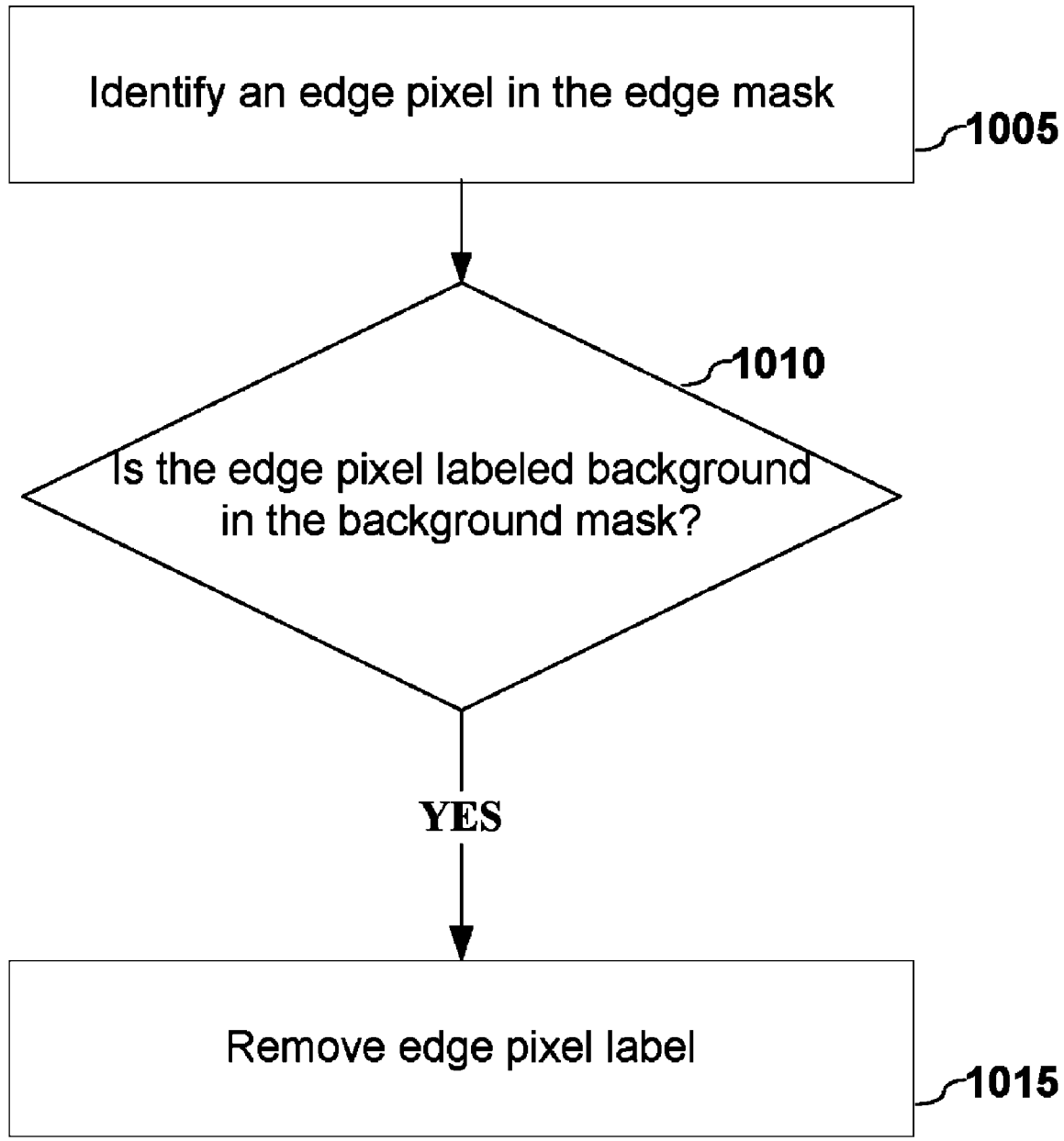
FIG. 10 depicts a method to exclude background pixels from an edge while refining an edge mask according to embodiments of the invention.

FIG. 10 depicts a method 1000 for excluding background pixels from an edge mask according to various embodiments of the invention. Method 1000 may be implemented as step 810 of embodiments of method 800, and by embodiments of background excluder 215. In step 1005, an edge pixel within the edge mask is identified. A "conflict test" decision analysis (step 1010) is applied to the edge pixel. If that pixel also was labeled a background pixel (e.g., during method 600), the label conflict may be resolved by removing edge label from the pixel and removing the pixel from the edge mask (step 1015). Alternatively, any edge pixel with a color the same or lighter than a background region color or colors may be removed from the edge mask.

c) Methods for Bright-Side Edge Pixel Removal

Figure 11:
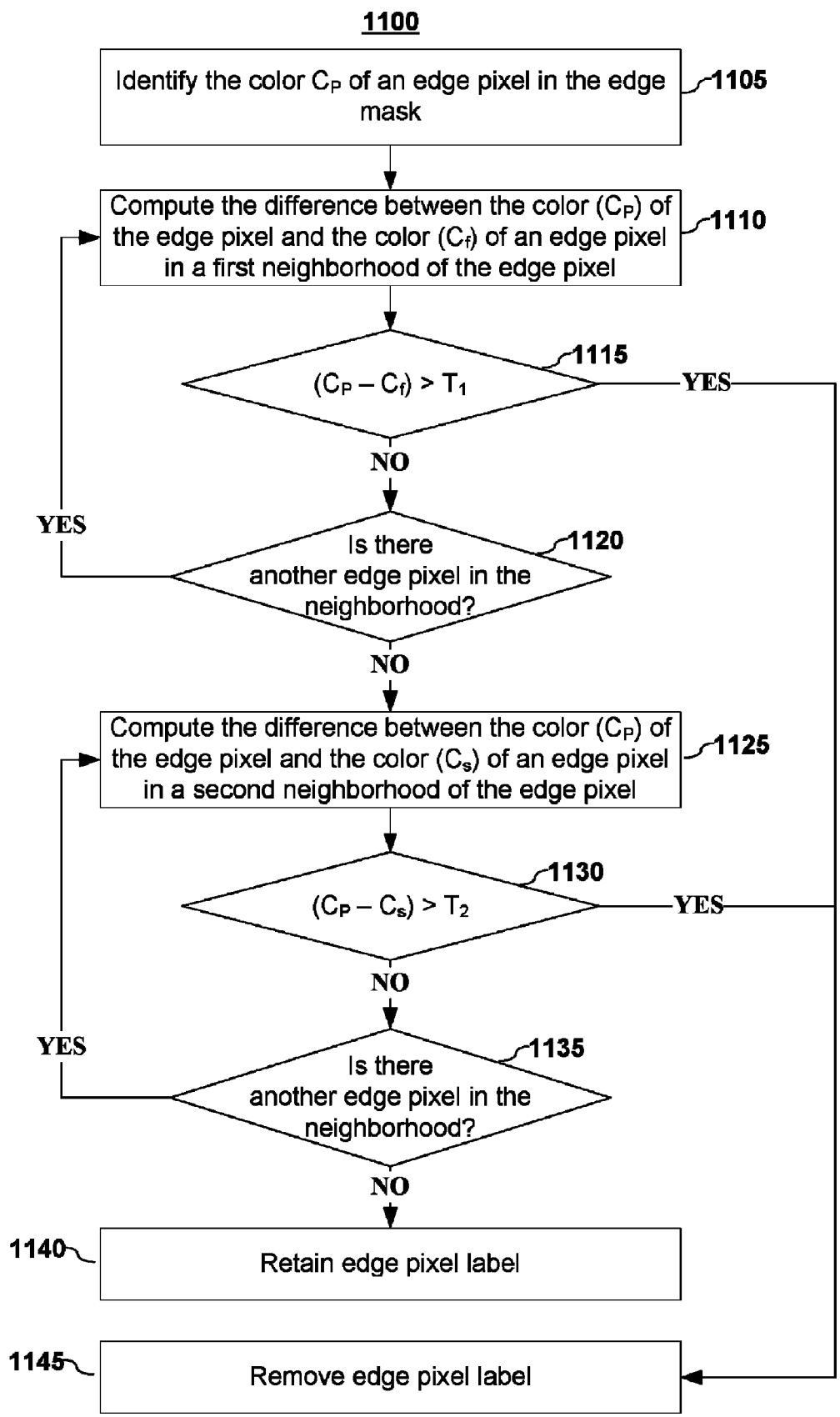
FIG. 11 depicts a method to remove bright-side edge pixels while refining an edge mask according to embodiments of the invention.

FIG. 11 depicts a method 1100 for removing bright-side edge pixels from an edge mask according to various embodiments of the invention. Method 1100 may be implemented as step 815 of embodiments of method 800, and by embodiments of bright-side edge pixel remover 220. In embodiments, a "bright-side edge pixel" is an edge pixel that is brighter by at least a threshold amount than its neighboring edge pixels within a region or regions.

In the depicted embodiment of FIG. 11, the color $C_P$ of an edge pixel in the edge mask is identified (step 1105), and the difference between the color $C_P$ of the identified edge pixel and the color values of the edge pixels contained within one or more neighborhoods is determined.

Figure 12:
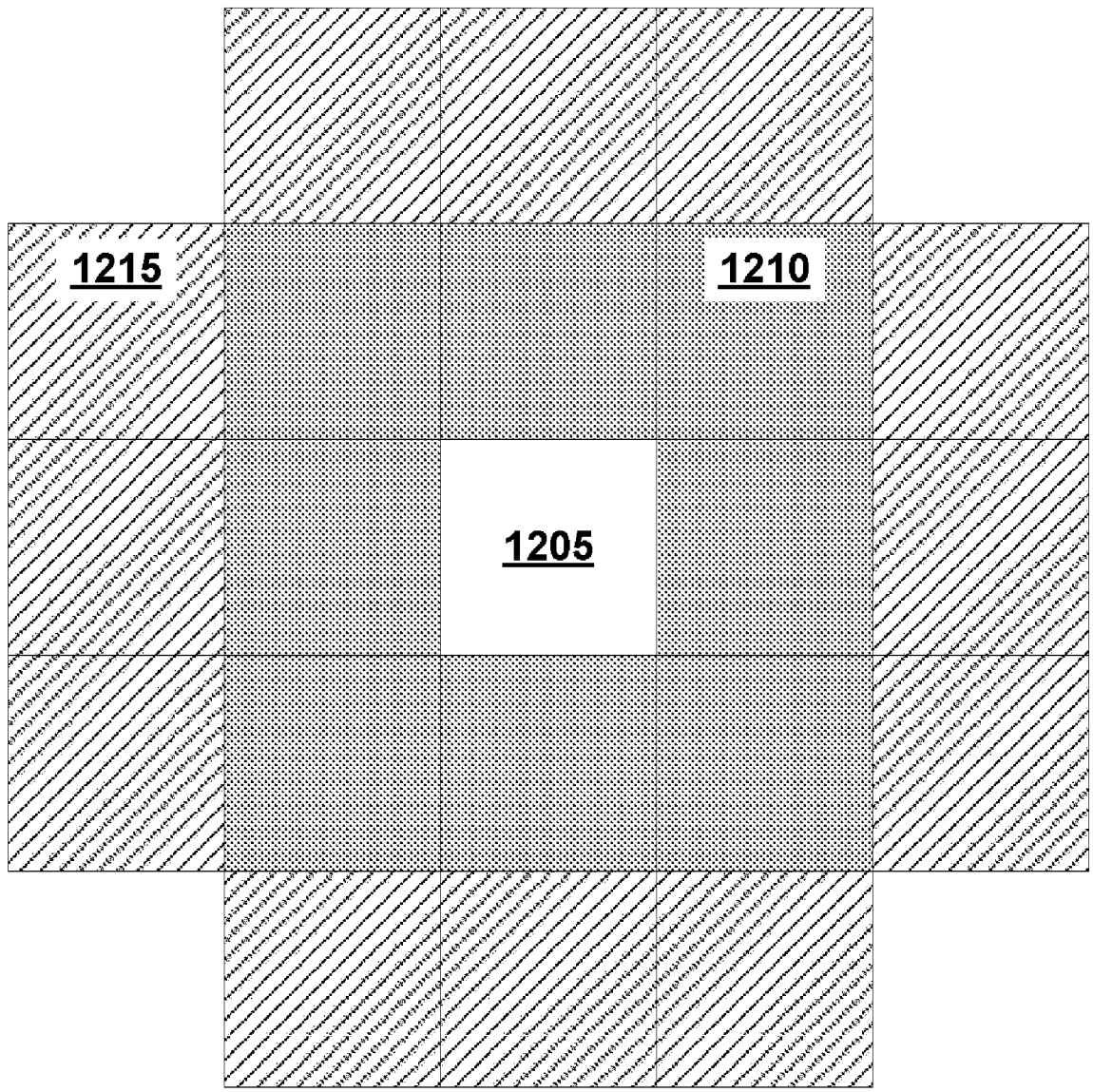
FIG. 12 illustrates 3×3 and partial 5×5 regions of neighboring pixels that may be applied during analysis for removal of bright-side edge pixels according to embodiments of the invention.

FIG. 12 illustrates examples of how neighboring regions 1200, 1210 may be defined according to various embodiments. Those skilled in the art will recognize that the illustrated regions are examples and that other sized and configured neighborhoods may be used. Neighborhood 1200 is a partial 5×5 neighborhood that includes neighboring pixels within a distance less than 2.5 pixels from the edge pixel 1205. Neighborhood 1200 is a partial 5×5 neighborhood that includes neighboring pixels within a distance less than 2.5 pixels from the edge pixel 1205. Neighborhood 1210 is a 3×3 neighborhood. In embodiments, a subset neighborhood may be used; for example, neighborhood 1215, which represents the partial 5×5 neighborhood minus the 3×3 neighborhood, may be used in determining whether a pixel located at location 1205 is a bright-side edge pixel.

In step 1110, a difference is calculated between the color $C_P$ and the color $C_f$ of edge pixels within a first neighborhood (such as, for example, within the 3×3 neighborhood 1210) of an edge pixel 1205. In step 1115, if the difference between the colors of the edge pixels is greater than a first bright-side threshold, $T_1$, the edge pixel at location 1205 may be removed (step 1145) from the edge mask. In an embodiment, that edge pixel may be labeled as a background pixel. If the difference between the colors of the edge pixels is not greater than a first bright-side threshold, $T_1$, the process may be repeated (step 1120) for another neighboring edge pixel.

In embodiments, if no other edge pixels exist within the first neighborhood, the process may stop. Alternatively, as depicted in FIG. 11, one or more additional regions may be examined. In step 1125, a difference is calculated between the color $C_P$ and the color $C_s$ of edge pixels within a second neighborhood (such as, for example, within the partial 5×5 neighborhood 1200) of an edge pixel 1205. In step 1130, if the difference between the colors of the edge pixels is greater than a second bright-side threshold, $T_2$, the edge pixel at location 1205 may be removed (step 1145) from the edge mask. In an embodiment, that edge pixel may be labeled as a background pixel. If the difference between the colors of the edge pixels is not greater than a first bright-side threshold, $T_1$, the process may be repeated (step 1135) for another neighboring edge pixel. One skilled in the art shall recognize that in embodiments where $T_1$ is less than $T_2$, the second neighborhood may be limited to 1215. In embodiments, $T_2$ may be defined to be greater than $T_1$ based on an assumption that more distant neighboring edge pixels may be brighter. For example, in an embodiment $T_2$ may be defined to be 112 and $T_1$ may be defined to be 96.

In alternative embodiments, $C_f$ may be the average color of edge pixels within a first neighborhood and $C_s$ may be the average color of edge pixels within a second neighborhood.

Returning to FIG. 11, if the edge pixel of interest (e.g., the edge pixel at location 1205) is not brighter by a threshold amount than its neighboring edge pixels, the edge pixel's edge label is retained (step 1140).

One skilled in the art shall recognize that other methods or ordering may be used to achieve the same or similar result as the methods depicted in FIG. 11 and that such other methods are within the scope of the present invention.

7. Method for Generating an Image Foreground Mask

In step 440, the refined thin edge mask generated from the refined dilated edge mask may be used to generate a foreground mask for the image. Step 440 may be implemented within embodiments of foreground mask generator 140.

Figure 13:
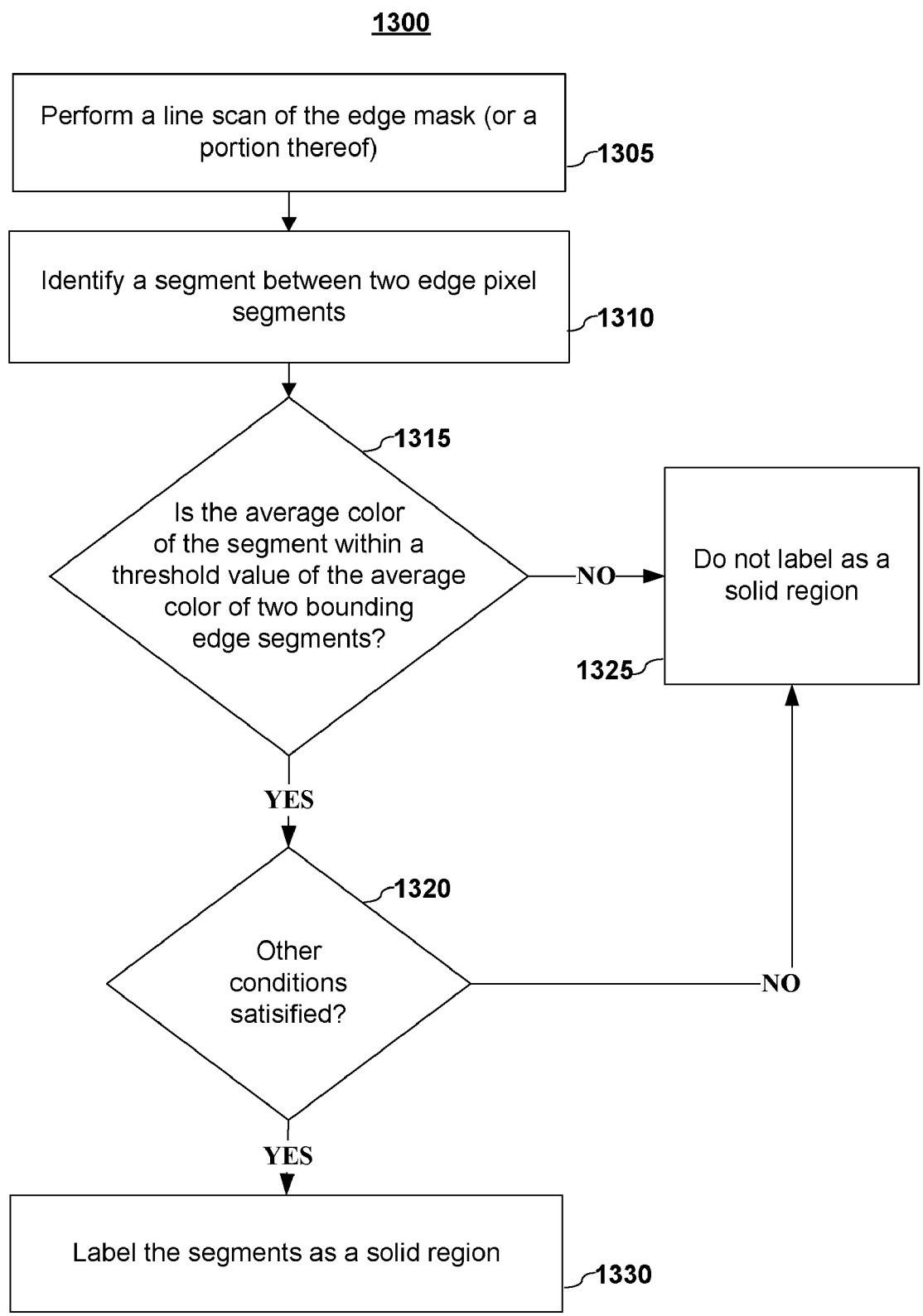
FIG. 13 depicts a method to label pixels in a solid region of an image using line scans according to embodiments of the invention.

FIG. 13 depicts a method 1300 for performing a color consistency analysis to extract regions, such as text items lying on image regions, in an image according to various embodiments of the invention. Method 1300 may be implemented within embodiments of step 440, and within embodiments of foreground mask generator 140. Horizontal and/or vertical line-by-line scans may be performed (step 1305) using the edge information, or a portion thereof. For each line scan, the line segments or regions, if any, are identified (step 1310) by pixel label type. It shall be noted that a line segment or region may be one or many pixels in size.

Figure 14:
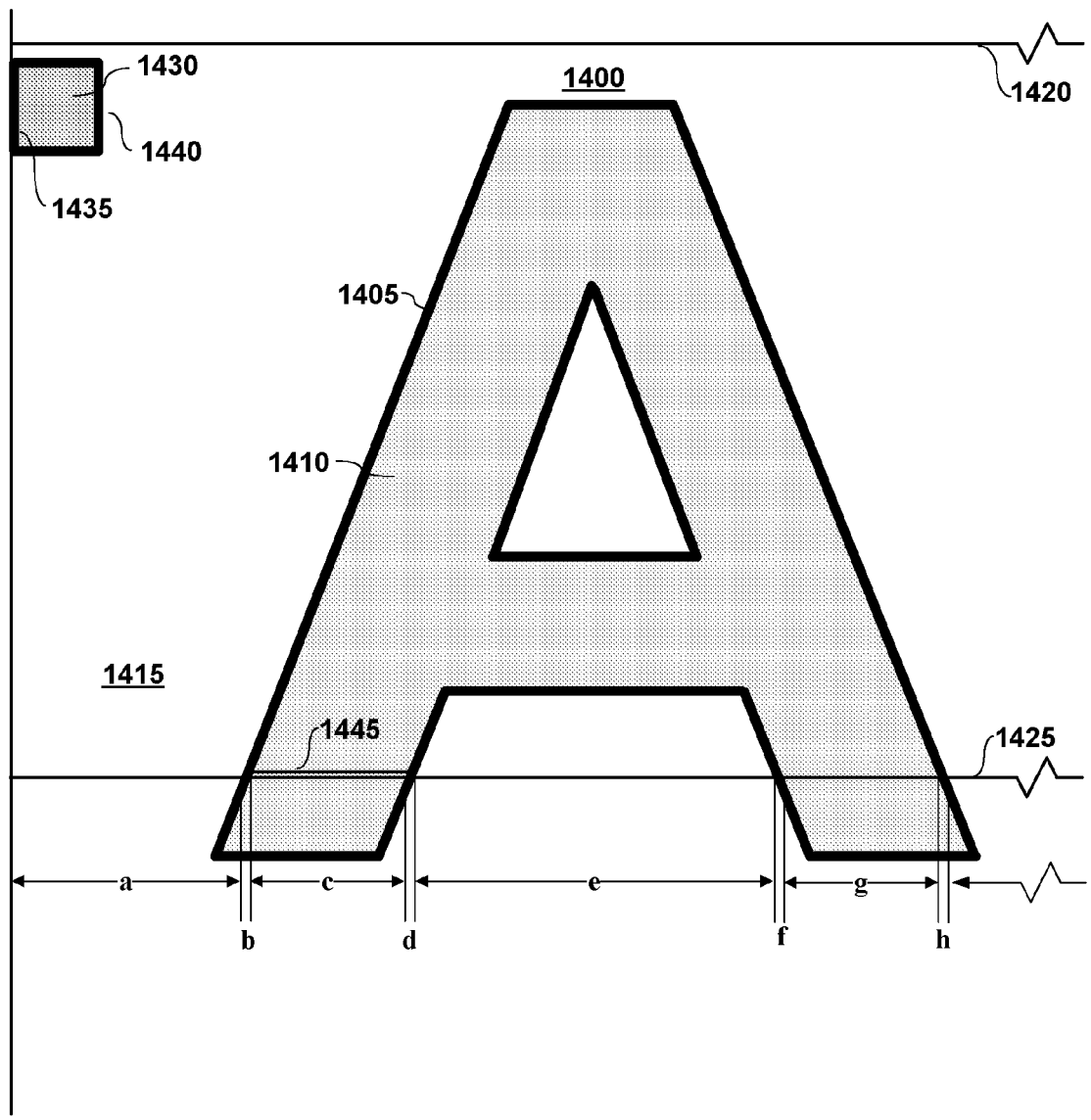
FIG. 14 depicts, for purposes of illustration, a portion of an input image document and example horizontal line scans, according to embodiments of the invention.

Illustrated in FIG. 14 are two horizontal line scans 1420, 1425 of a portion of a document containing the letter "A." The border 1405 of the letter "A" 1400 represents the edge pixels obtained from the edge mask. The interior pixels 1410 represent halftone or non-halftone pixels. The letter A 1400 resides on an image region 1415 that may be background, halftone, or non-halftone pixels. Because line scan 1420 does not intersect any of letter A 1400, it is a single line segment. Note, however, that line scan 1425 intersects letter A 1400 at several places. The first segment, a, comprises the pixels from the start of the line scan until the start of the edge pixels 1405 of the letter A 1400. Segments b and d comprise edge pixels of the edge of the letter A 1400; segment c comprises interior pixels of the letter A 1400 between the two edge pixel boundary segments, b and d; and so forth. A comparison is made (step 1315) of the segments to identify regions, such as text regions. In various embodiments, the color of segment c may be compared (step 1315) against the color of segment b with the color of segment d. If the difference in color between segment c and the edge segments b and d is below some threshold level, then the segments may be considered as part of a single solid region and may be classified (step 1330) as such. If the difference in color between segment c and the edge segments b and d exceeds the threshold level, then the segments may not be classified (step 1325) as a solid color region. In an embodiment, the color of the segment bounded by edge pixels, in this case segment c, may be compared against an average of the colors of the two bounding edge pixels segments, segments b and d. If the difference between the values is below a solid color region threshold level Tscr, as shown in the following formula:

$$\left| c - \frac{b+d}{2} \right| < Tscr,$$

the segments may be classified as a solid color region (step 1330). In an embodiment, the average (mean, median, or mode) color of the segments may be used in the comparison process. In embodiments, any background pixels that reside along a line segment that has been classified as a solid region may not be classified as solid region but may remain as background pixels. One skilled in the art will recognize that the larger the threshold value (Tscr), the more variance in color the segments may have and still be classified as a solid color region.

In embodiments, the edge labels may be added to all or a portion of the image to avoid artifacts when items, such as text, appears at the image border. Consider, by way of illustration, the region 1430 appearing in FIG. 14, wherein edge pixels 1435 along the image border have been added. In the depiction, the darker exterior indicates pixels labeled as edge pixels and the lighter interior pixels represent non-edge pixels. When performing the color consistency analysis, a line scan will identify a line segment through region 1430 as being a solid region, assuming the other conditions are met, because it will be bounded by two edge pixels 1435 and 1440.

In embodiments, additional conditions may be applied (step 1320) as part of the color consistency analysis. An additional condition may include examining the neighboring pixels of the immediately preceding line segment. If the neighboring pixels are not substantially edge pixels or are not substantially identified as a solid region during its color consistency analysis, then the line segment may not be identified (step 1325) as a solid region.

Consider, for purposes of illustration, the following example. Assuming that the segments b, c, and d met the conditions that the difference in color between segment c and the edge segments b and d was below a threshold level, the neighboring pixels to combined line segment b+c+d that were previously examined may be checked to determine if a number exceeding a threshold value of those pixels were also identified as a solid region. For example, assuming the line-by-line scan proceeded from top to bottom, the line segment of pixel neighboring line segment b+c+d would be the pixels directly above, as identified by line 1445 in FIG. 12. In an embodiment, if a threshold number of pixels on line 1445 had been identified as a solid region, line segment b+c+d would also be identified as a solid region; otherwise, line segment b+c+d would not be identified as a solid region.

In embodiments, the color consistency analysis may also include one or more threshold size restrictions or limitations. For example, if combined line segment b+c+d exceeds a threshold number of pixels, it may also be excluded from being classed as a solid color region. One skilled in the art shall recognize that a threshold size limit may be placed on any combination of the segments or any portion thereof.

In embodiments, a restriction may be placed on the brightness of pixels that may be classified as a solid region. For example, a set range of light colors may be excluded from being classified as a solid region.

One skilled in the art will recognize that the threshold levels and restrictions, including but not limited to, the maximum color variation, the maximum width, and the brightness of colors of such regions may be configured differently according to a number of factors, including but not limited to the operation mode (text, magazine, or photo) and the type of desired text (background or halftone).

8. Image Post Processing

One skilled in the art shall recognize that, having obtained image layers, any of a number of post-processing operations may be optionally performed (step 445). Image enhancement, image compression, watermarking, special effects, and video editing are examples of post-processing operations that may be alternatively performed or alternatively included within a system, such as system 100, 300.

a) Layer-Based Compression and Composite Generator

In embodiments, system 100, or portions thereof, may be used to help generate compressed documents. The compressed document may represent a composite of compressed segmented image layers and may have enhanced visual quality and much smaller file size. In an embodiment, the resulting compression document may be in a portable document format ("PDF"), but one skilled in the art shall recognize that other viewers and formats may be employed.

In embodiments, the background and foreground image layers may be compressed using one or more compression algorithms. In an embodiment, a JPEG compression with the same or different compression ratios may be used to compress the background and foreground image layers.

In an embodiment, the composite of two compressed image layers (foreground and background) may be achieved by maintaining an image mask that identifies foreground pixels. In one embodiment, this mask may be kept intact with lossless compression, such as JBIG2, to minimize file size. In an embodiment, the foreground and background image layers may be downsampled, such as, for example, by a ratio of 3:1, and the mask may be maintained at a ratio of 1:1. In embodiments, system 100 may include a downsampler (not shown) to downsample the foreground and/or background image layers.

It shall be noted that the present invention may be implemented in any instruction-execution/computing device or system capable of processing the image data, including without limitation, a general-purpose computer and a specific computer, such as one intended for graphics processing. The present invention may also be implemented into other computing devices and systems, including without limitation, a digital camera, a printer, a scanner, a multiple function printer/scanner, a facsimile machine, a multimedia device, and any other device that processes, captures, transmits, or stores an image. Furthermore, within any of the devices, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 15:
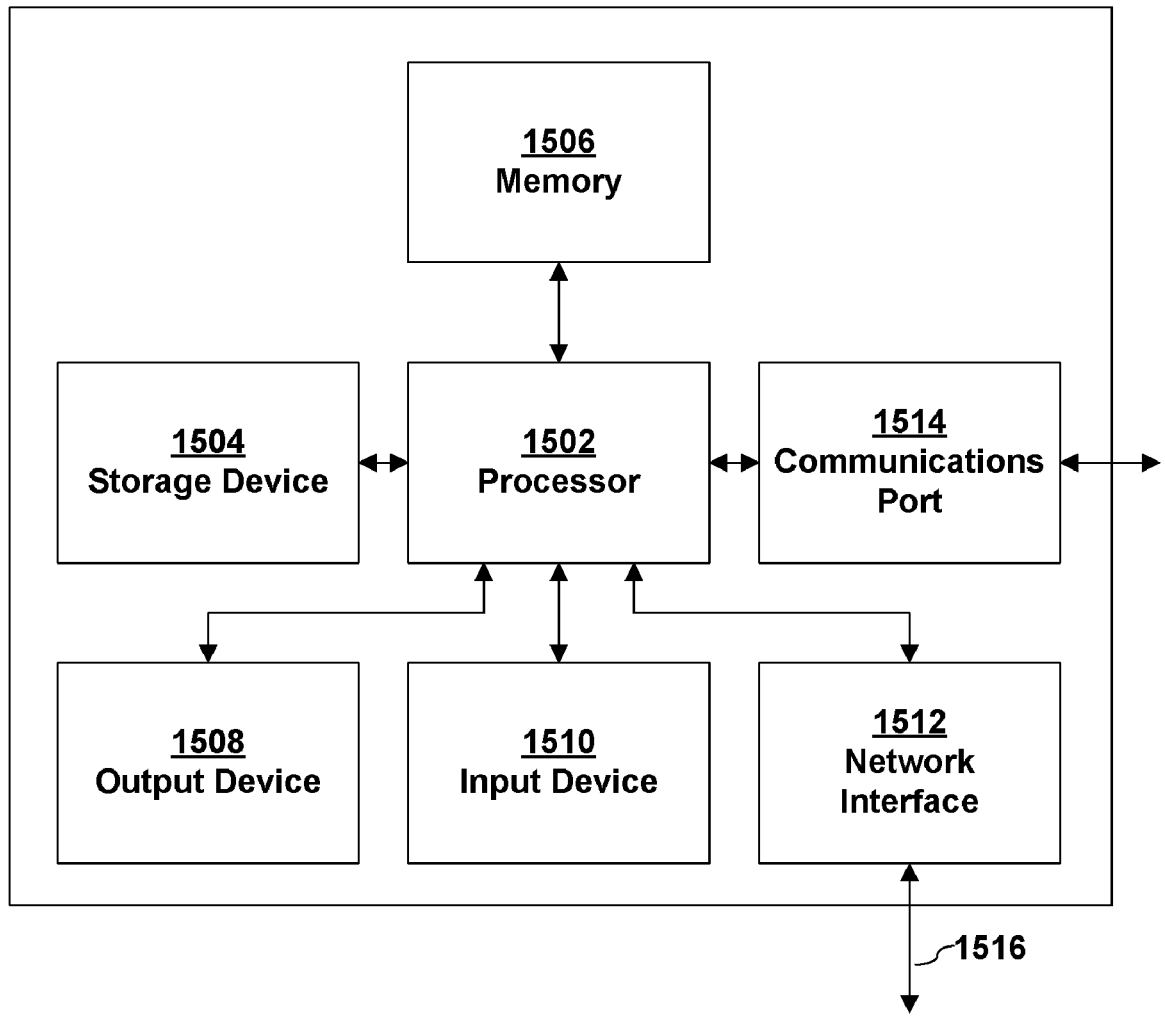
FIG. 15 depicts a block diagram of a computing system according to embodiments of the invention.

FIG. 15 depicts a functional block diagram of an embodiment of an instruction-execution/computing device 1500 that may implement or embody embodiments of the present invention. As illustrated in FIG. 15, a processor 1502 executes software instructions and interacts with other system components. In an embodiment, processor 1502 may be a general purpose processor such as an AMD processor, an INTEL x86 processor, a SUN MICROSYSTEMS SPARC, or a POWERPC compatible-CPU, or the processor may be an application specific processor or processors. A storage device 1504, coupled to processor 1502, provides long-term storage of data and software programs. Storage device 1504 may be a hard disk drive and/or another device capable of storing data, such as a computer-readable media (e.g., diskettes, tapes, compact disk, DVD, and the like) drive or a solid-state memory device. Storage device 1504 may hold programs, instructions, and/or data for use with processor 1502. In an embodiment, programs or instructions stored on or loaded from storage device 1504 may be loaded into memory 1506 and executed by processor 1502. In an embodiment, storage device 1504 holds programs or instructions for implementing an operating system on processor 1502. In one embodiment, possible operating systems include, but are not limited to, UNIX, AIX, LINUX, Microsoft Windows, and the Apple MAC OS. In embodiments, the operating system executes on, and controls the operation of, the computing system 1500.

An addressable memory 1506, coupled to processor 1502, may be used to store data and software instructions to be executed by processor 1502. Memory 1506 may be, for example, firmware, read only memory (ROM), flash memory, non-volatile random access memory (NVRAM), random access memory (RAM), or any combination thereof In one embodiment, memory 1506 stores a number of software objects, otherwise known as services, utilities, or modules. One skilled in the art will also recognize that storage 1504 and memory 1506 may be the same items and function in both capacities. In an embodiment, one or more of the components of FIG. 1, 2, or 3 may be modules stored in memory 1504, 1506 and executed by processor 1502.

In an embodiment, computing system 1500 provides the ability to communicate with other devices, other networks, or both. Computing system 1500 may include one or more network interfaces or adapters 1512, 1514 to communicatively couple computing system 1500 to other networks and devices. For example, computing system 1500 may include a network interface 1512, a communications port 1514, or both, each of which are communicatively coupled to processor 1502, and which may be used to couple computing system 1500 to other computer systems, networks, and devices.

In an embodiment, computing system 1500 may include one or more output devices 1508, coupled to processor 1502, to facilitate displaying graphics and text. Output devices 1508 may include, but are not limited to, a display, LCD screen, CRT monitor, printer, touch screen, or other device for displaying information. Computing system 1500 may also include a graphics adapter (not shown) to assist in displaying information or images on output device 1508.

One or more input devices 1510, coupled to processor 1502, may be used to facilitate user input. Input device 1510 may include, but are not limited to, a pointing device, such as a mouse, trackball, or touchpad, and may also include a keyboard or keypad to input data or instructions into computing system 1500.

In an embodiment, computing system 1500 may receive input, whether through communications port 1514, network interface 1516, stored data in memory 1504/1506, or through an input device 1510, from a scanner, copier, facsimile machine, or other computing device.

One skilled in the art will recognize no computing system is critical to the practice of the present invention. One skilled in the art will also recognize that a number of the elements described above may be physically and/or functionally separated into sub-modules or combined together.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

I claim:

1. A method for segmenting an image comprising pixels, the method comprising:
    generating a background mask corresponding to pixels that have been identified as background pixels in the image;
    generating an edge mask corresponding to pixels that have been identified as edge pixels in the image;
    dilating the edge mask;
    generating a refined edge mask by performing the steps comprising:
        responsive to a dilated edge pixel from the edge mask not satisfying any criterion from a set of darkness criteria, removing the dilated edge pixel from the edge mask;
        responsive to an edge pixel from the edge mask that is also assigned a background label in the background mask, removing the edge pixel from the edge mask; and
        responsive to a color value of an edge pixel from the edge mask being brighter by a threshold than a color value of at least one edge pixel from a neighborhood of the edge pixel, removing the edge pixel from the edge mask; and
    using the refined edge mask to generate a foreground mask;
    wherein the method is implemented by using one or more processors.

2. The method of claim 1 wherein the set of darkness criteria comprises:
    a first average color value for image pixels within a first neighborhood of a dilated edge pixel being less than a first threshold value; and
    a difference between the first average color value and a second average color value from a second neighborhood of the dilated edge pixel, wherein the second neighborhood is smaller than the first neighborhood, being greater than a second threshold value.

3. The method of claim 1 wherein the color value of an edge pixel from the edge mask being brighter by at least a threshold than the color value of at least one edge pixel from a neighborhood of the edge pixel comprises:
    a difference between the color value of the edge pixel and a color value of at least one edge pixel in a first neighborhood of the edge pixel being greater than a first threshold; and
    a difference between the color value of the edge pixel and a color value of at least one edge pixel in a second neighborhood of the edge pixel being greater than a second threshold.

4. The method of claim 1 wherein the step of generating a background mask corresponding to pixels that have been identified as background pixels in the image comprises:
    converting the image into grayscale;
    generating a histogram of grayscale intensity;
    identifying a dominant background color in a region of the histogram;
    calculating a background color threshold value using the dominant background color; and
    assigning a background label to the pixels that have a grayscale intensity value greater than the background color threshold value.

5. The method of claim 1 wherein the step of generating the foreground mask comprises the steps of:
    using line scans to identify a non-edge pixel segment bounded by a first edge pixel segment and by a second edge pixel segment;
    computing a first color value for the first edge pixel segment, a second color value for the second edge pixel segment, and a non-edge-pixel segment color value for the non-edge-pixel segment; and
    responsive to the difference between the non-edge-pixel segment color value and the average of the first and second color values being below a threshold value, and responsive to a threshold size limit being satisfied, identifying the combined first edge pixel segment, second edge pixel segment, and non-edge-pixel segment as solid region pixels.

6. The method of claim 1 further comprising the step of using the generated foreground mask to compress the image.

7. The method of claim 6 wherein the compressed image is a portable document format ("PDF") image.

8. The method of claim 1 further comprising the step of applying a median filter to non-edge areas of the image.

9. The method of claim 1 further comprising the step of:
    responsive to receiving a non-color-adjusted image, color adjusting the image.

10. A non-transitory computer readable medium having instructions for performing the method of claim 1.

11. A system for segmenting an image comprising pixels, the system comprising:
    a background mask generator, coupled to receive the image, that generates a background mask corresponding to pixels that have been identified as background pixels in the image;

an edge detector, coupled to receive the image, that generates an edge mask corresponding to pixels that have been identified as edge pixels in the image;

an edge mask dilator, coupled to receive the edge mask, that dilates the edge mask;

an edge mask refiner, coupled to receive the edge mask, that generates a refined edge mask by:

responsive to a dilated edge pixel from the edge mask not satisfying any criterion from a set of darkness criteria, removing the dilated edge pixel from the edge mask;

responsive to an edge pixel from the edge mask that is also assigned a background label in the background mask, removing the edge pixel from the edge mask; and responsive to a color value of an edge pixel from the edge mask being brighter by at least a threshold amount than a color value of at least one edge pixel from a neighborhood of the edge pixel, removing the edge pixel from the edge mask; and a foreground mask generator, coupled to receive the refined edge mask, that generates a foreground mask;

wherein at least one of the background mask generator, the edge detector, the edge mask dilator, the edge mask refiner, and the foreground mask generator is embodied at least in part in one or more processors.

12. The system of claim 11 wherein the set of darkness criteria comprises:

a first average color value for image pixels within a first neighborhood of a dilated edge pixel being less than a first threshold value; and a difference between the first average color value and a second average color value from a second neighborhood of the dilated edge pixel, wherein the second neighborhood is smaller than the first neighborhood, being greater than a second threshold value.

13. The system of claim 11 wherein the color value of an edge pixel from the edge mask being brighter by at least a threshold amount than the average color value of at least one edge pixel from a neighborhood of the edge pixel comprises:

a difference between the color value of the edge pixel and a color value of at least one edge pixel in a first neighborhood of the edge pixel being greater than a first threshold; and a difference between the color value of the edge pixel and a color value of at least one edge pixel in a second neighborhood of the edge pixel being greater than a second threshold.

14. The system of claim 11 wherein generating a background mask corresponding to pixels that have been identified as background pixels in the image comprises:

converting the image into grayscale;

generating a histogram of grayscale intensity;

identifying a dominant background color in a region of the histogram;

calculating a background color threshold value using the dominant background color; and assigning a background label to the pixels that have a grayscale intensity value greater than the background color threshold value.

15. The system of claim 11 wherein generating the foreground mask comprises:

using line scans to identify a non-edge pixel segment bounded by a first edge pixel segment and by a second edge pixel segment;

computing a first color value for the first edge pixel segment, a second color value for the second edge pixel segment, and a non-edge-pixel segment color value for the non-edge-pixel segment; and responsive to the difference between the non-edge-pixel segment color value and the average of the first and second color values being below a threshold value, and responsive to a threshold size limit being satisfied, identifying the combined first edge pixel segment, second edge pixel segment, and non-edge-pixel segment as solid region pixels.

16. The system of claim 11 further comprising an image post processor, coupled to receive the generated foreground mask.

17. The system of claim 16 wherein the image post processor compresses the image into a document.

18. An apparatus for refining an edge mask, the apparatus comprising:

a dark edge pixel retainer, coupled to receive an edge mask, that responsive to a dilated edge pixel from the edge mask not satisfying any criterion from a set of darkness criteria, removes the dilated edge pixel from the edge mask;

a background excluder, coupled to receive an edge mask, that responsive to an edge pixel from the edge mask that is also assigned a background label in a background mask, removes the edge pixel from the edge mask; and a bright-side edge pixel remover, coupled to receive an edge mask, that responsive to a color value of an edge pixel from the edge mask being brighter by at least a threshold amount than a color value of at least one edge pixel from a neighborhood of the edge pixel, removes the edge pixel from the edge mask;

wherein at least one of the dark edge pixel retainer, the background excluder, and the bright-side edge pixel remover is embodied at least in part in one or more processors.

19. The apparatus of claim 18 wherein the set of darkness criteria comprises:

a first average color value for image pixels within a first neighborhood of a dilated edge pixel being less than a first threshold value; and a difference between the first average color value and a second average color value from a second neighborhood of the dilated edge pixel, wherein the second neighborhood is smaller than the first neighborhood, being greater than a second threshold value.

20. The apparatus of claim 18 wherein the color value of an edge pixel from the edge mask being brighter by at least a threshold amount than the average color value of at least one edge pixel from a neighborhood of the edge pixel comprises:

a difference between the color value of the edge pixel and a color value of at least one edge pixel in a first neighborhood of the edge pixel being greater than a first threshold; and a difference between the color value of the edge pixel and a color value of at least one edge pixel in a second neighborhood of the edge pixel being greater than a second threshold.

* * * * *